United States Patent [19]

Hiler

[11] Patent Number: 5,382,195

[45] Date of Patent: Jan. 17, 1995

[54] METHOD FOR MAKING A SELF-DRILLING AND SELF-TAPPING SCREW

[75] Inventor: Allen J. Hiler, Shelby, Ohio

[73] Assignee: Atlas Bolt & Screw Company, Ashland, Ohio

[21] Appl. No.: 995,112

[22] Filed: Dec. 22, 1992

[51] Int. Cl.⁶ ............................................... B23G 9/00
[52] U.S. Cl. ............................................ 470/9; 409/211
[58] Field of Search ................... 408/46; 409/78, 204, 409/211; 470/8, 9, 76, 156, 160, 161

[56] References Cited

U.S. PATENT DOCUMENTS

| | | |
|---|---|---|
| 1,999,264 | 4/1935 | Tilton ........................................ 470/10 |
| 3,044,341 | 7/1962 | Stern . |
| 3,079,831 | 5/1963 | Gutshall . |
| 3,094,893 | 6/1963 | Lindstrom . |
| 3,094,895 | 6/1963 | Broberg . |
| 3,125,923 | 3/1964 | Hanneman . |
| 3,164,851 | 1/1965 | Hanneman . |
| 3,207,024 | 9/1965 | Sommer . |
| 3,231,132 | 1/1966 | Hanneman . |
| 3,238,836 | 3/1966 | Johnson . |
| 3,241,426 | 3/1966 | Gutshall . |
| 3,280,412 | 10/1966 | Hanneman et al. . |
| 3,288,015 | 11/1966 | Hanneman . |
| 3,318,182 | 5/1967 | Carlson . |
| 3,395,603 | 8/1968 | Skierski . |
| 3,422,472 | 1/1969 | Pomernacki . |
| 3,438,299 | 4/1969 | Gutshall . |
| 3,463,045 | 8/1969 | Prescott . |
| 3,507,183 | 4/1970 | Thurston . |
| 3,517,581 | 6/1970 | Stokes et al. . |
| 3,578,762 | 5/1971 | Siebol et al. . |
| 3,738,218 | 6/1973 | Gutshall . |
| 3,780,389 | 12/1973 | Lindstrom ........................... 10/10 R |
| 3,933,075 | 1/1976 | Peterson ................................ 470/9 |
| 4,071,918 | 2/1978 | Baer ................................... 10/10 R |
| 4,138,754 | 2/1979 | Baer ........................................ 10/2 |
| 4,532,663 | 8/1985 | Sygnator ........................... 10/10 R |
| 4,565,475 | 1/1986 | Sygnator ................................ 470/9 |
| 4,730,373 | 3/1988 | Senoh .................................. 408/46 |

Primary Examiner—Lowell A. Larson
Assistant Examiner—Thomas C. Schoeffler
Attorney, Agent, or Firm—Keck, Mahin & Cate; Jon Carl Gealow

[57] ABSTRACT

A self-drilling and tapping screw, the self-drilling portion of which is formed in two major operations. A cutting tip is formed on the tip of a screw blank by a pair of rotating circular saw blades in a first operation. A pair of flutes extending from the cutting tip to the threaded portion of the stem are formed by a second pair of rotating circular saw blades in a second operation.

10 Claims, 5 Drawing Sheets

METHOD FOR MAKING A SELF-DRILLING AND SELF-TAPPING SCREW

BACKGROUND OF THE INVENTION

1. Field of the Invention

This invention relates to self-drilling and self-tapping screws, and to a method and apparatus for forming the self-drilling portion of the screw. Various methods and apparatus have been used in the past to form the cutting tip and flutes on the self-drilling portion of a screw blank which is to be formed into a self-drilling and self-tapping screw. These prior art methods and apparatus have been used to manufacture self-drilling and self-tapping screws which provide various characteristics in terms of torque required to drill and thread the screw into work pieces, and the relative easy and efficiency with which the screw is manufactured. The desired configuration of the cutting tip and of the flutes determined the method and apparatus required to shape a screw blank, and conversely the method and apparatus used determined to some extent the ability to provide the desired configuration of the cutting tip and flutes.

2. Description of Related Art Including Information Disclosed under Secs. 1.97-1.99

Reflecting the various manufacturing and screw performance objectives, numerous patents have issued in the past directed to methods and apparatus for forming self-drilling and self-tapping screws and the screws formed thereby. Some of these patents, and more particularly those wherein the point and flutes of self-tapping screws are formed by a sawing operation, are as follows:

| U.S. PAT. NO. | INVENTOR(S) |
| --- | --- |
| 3,231,132 | Hanneman |
| 3,280,412 | Hanneman et al |
| 3,288,015 | Hanneman |
| 3,422,472 | Pomernacki |
| 3,738,218 | Gutshall |
| 3,780,389 | Lindstrom |
| 4,071,918 | Baer |

All of the above-mentioned patents disclose various methods or apparatuses for manufacturing self-drilling and self-tapping screws, by which the points or flutes are formed by rotary cutters. The cutting teeth are located on the periphery of a cylindrical or disk shaped cutter. U.S. Pat. No. 3,231,132—Hanneman reveals an apparatus for forming drill pointed thread cutting screws wherein the point is formed by a milling cutter with a V-shaped cutting edge and the flutes are formed by offset saws fixed in position with respect to each other.

U.S. Pat. No. 3,280,412—Hanneman et al, reveals an apparatus wherein rotating milling cutters rotate into and out of engagement with the screw blank, but which do not move laterally with respect to the screw blank during the cutting operation so as to form an elongated slot.

U.S. Pat. No. 3,288,015—Hanneman, reveals a drilling and thread forming screw wherein the diameter of a rotary cutter determines the curvature of the slot surface.

U.S. Pat. No. 3,422,472—Pomernacki, reveals a method and apparatus for making drill screws wherein a pair of saws at different operation stations are used to form the pointed tip, and a second pair of saws also located at different stations are used to form the slots or flutes. The saws which form the slots or flutes do not move longitudinally with respect to the screw blank during the cutting operation so as to form an elongated flute.

U.S. Pat. No. 3,738,218—Gutshall, reveals a drilling and thread forming fastener wherein the groove or slot is formed by a cutter with a circular head having end cutting teeth.

U.S. Pat. No. 3,780,389—Lindstrom, reveals a method of manufacturing of self-drilling and self-tapping fasteners wherein grooves are formed by rotating cutters which do not move longitudinally with respect to the screw blank while cutting the groove.

Finally, U.S. Pat. No. 4,071,918—Baer, reveals a method of producing drill screws wherein a single rotary saw is located at each work station. Thus, the pointing operation is formed at two stations, and the fluting operation, which involves cutting by two saws to form each flute, is performed at four stations. Neither of the pairs of rotary saws used to form a flute moves longitudinally with respect to the blank as it is cutting the flute.

SUMMARY OF THE INVENTION

It is an object of this invention to provide a method and apparatus for making a self-drilling and self-tapping screw which provides improved performance, particularly when secured in thicker materials. It is a further object of this invention to provide a method and apparatus for manufacturing a self-drilling and self-tapping screw of improved performance wherein the self-drilling point and self-tapping portions of the screw are formed by a minimum number of operations so as to more efficiently manufacture the screw. It is a further object of this invention to provide a method and apparatus for manufacturing a screw with flutes of greater axial length than has been possible with prior manufacturing methods. It is a still further object of this invention to form the flutes in a single manufacturing operation.

In accordance with this invention, the point and flutes portion of a self-drilling and self-tapping screw are each formed in a separate single manufacturing operation. A screw blank is engaged at one manufacturing station with a pair of rotating saw blades to form the point of the self-drilling and self-tapping screw. At a second station, a pair of elongated flutes are formed by a pair of rotating saw blades, the axis of rotation each of which saw blades pivots about a point remote from the screw blank. The axis of each rotary saw blade is rotated about the remote point while the blade is in cutting engagement with the screw blank so as to form an elongated slot.

DETAILED DESCRIPTION OF THE PREFERRED EMBODIMENT

Figure 1:
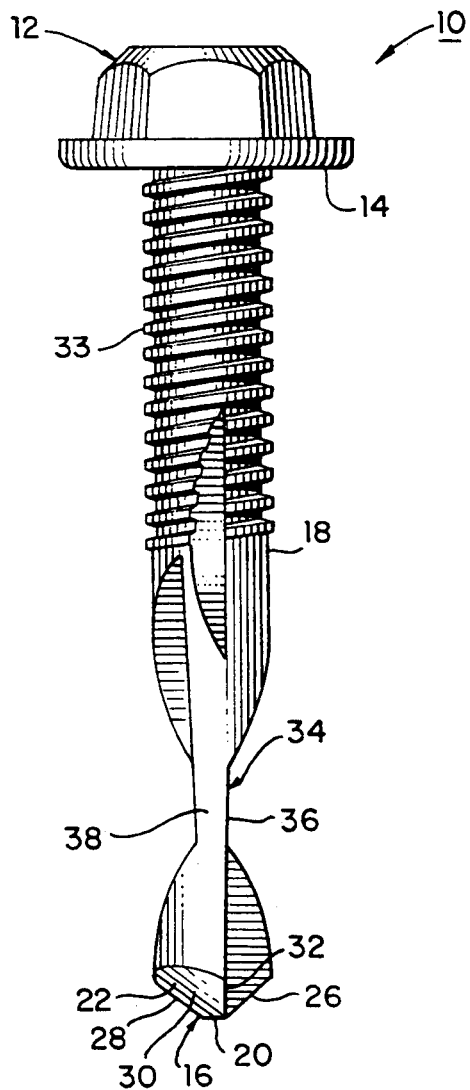
FIG. 1 is an enlarged first side elevation view of a self-drilling and self-tapping screw in accordance with this invention.
Figure 2:
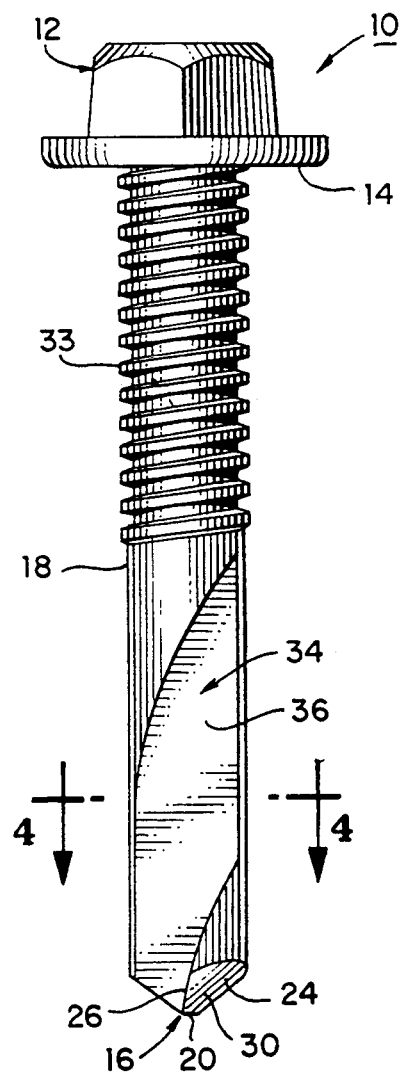
FIG. 2 is a side elevation view of the screw shown in FIG. 1 rotated 90°.
Figure 3:
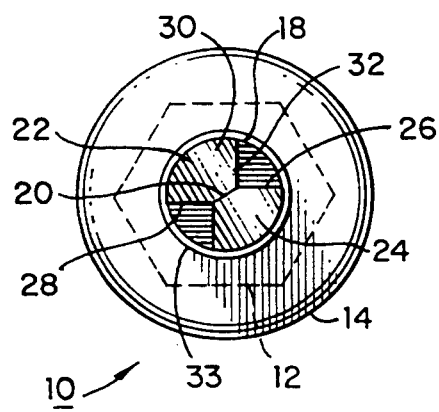
FIG. 3 is a bottom elevation view of the screw shown in FIG. 1.

A self-drilling and self-tapping screw 10 in accordance with this invention is shown in FIGS. 1 and 2. The screw 10 is provided with a drive head 12 having a skirt 14 located thereunder. The distal end 16 of the screw shank 18 is provided with a point 20 formed as two quadrants 22 and 24. A face of one of the cutting edges of the screw point is shown at 26, while a back view of the other cutting edge is shown at 28. The sloped portion 30 of the point is relieved, that is, it has a smaller diameter at edge 32 than at the cutting edge 28, such that it does not drag on the material into which the self-drilling and self-tapping screw is inserted.

Figure 4:
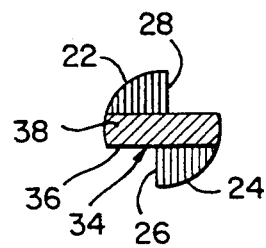
FIG. 4 is a cross-sectional view of the screw taken along the line 4—4 in FIG. 2.

A pair of flutes extending from the distal end 16 to a threaded portion 32 of the screw are formed on opposite sides of the screw shank. One of which flutes 34 is shown in FIG. 2, while the other of flute (not shown) is located on the side of the screw opposite flute 34. Referring more particularly to FIGS. 1, 2 and 4, it will be noted that the flute 34 has an essentially flat bottom surface 36 which is generally in a plane parallel to a plane passing through both the major axis and a diameter of the screw. Similarly, the second flute (not shown) has a flat bottom surface which is also generally in a plane parallel to a plane passing through both the major axis and a diameter of the screw. Thus, the self-drilling portion of the screw 10 has a portion 38 of generally rectangular cross-section as shown in FIGS. 1 and 4.

Figure 5A:
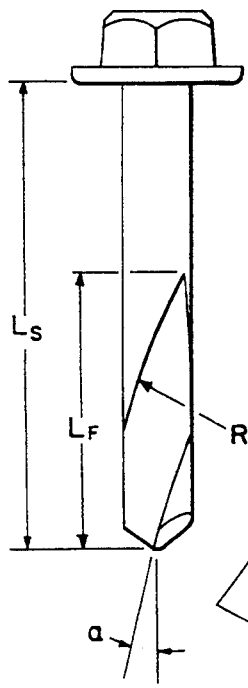
FIG. 5A is an outlined side elevation view on a reduced scale of the self-drilling and self-tapping screw as shown in FIG. 1 with dimensions for one of the preferred embodiments of the screw of this invention.
Figure 5B:
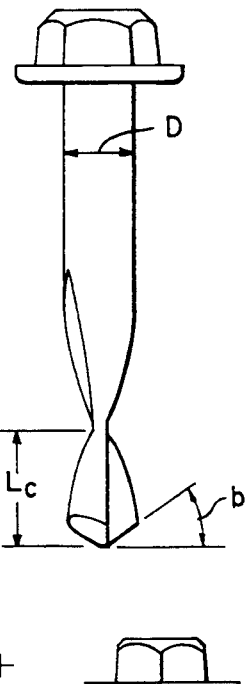
FIG. 5B is an outlined side elevation view of the self-drilling and self-tapping screw as shown in FIG. 5A rotated 90°.
Figure 6A:
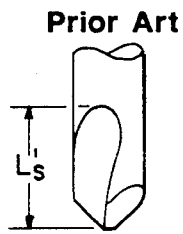
FIG. 6A is a side elevation view corresponding to FIG. 5A of a prior art self-drilling and self-tapping screw.
Figure 6B:
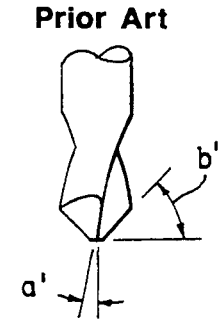
FIG. 6B is a side elevation view of the screw shown in 6A rotated 90°.
Figure 6C:
FIG. 6C is a bottom elevation view of the screw shown in FIG. 6B.
Figure 5C:
FIG. 5C is a bottom view of the screw shown in FIG. 5B.

Due to the method by which the self-drilling portion of a screw is formed in accordance with this invention, the flutes extend over a greater length of the cylindrical portion of the screw blank than do the flutes in self-drilling and self-tapping screws found in the prior art. The self-drilling portion of a screw in accordance with this invention is shown in FIGS. 5A, 5B and 5C, while that of a prior art screw is shown in FIGS. 6A, 6B and 6C. Comparing the screw of this invention shown in FIGS. 5A, 5B and 5C to those of FIGS. 6A, 6B and 6C it will be noted that flutes formed in accordance with the present invention extend for a greater axial distance on the screw blank than do those of the prior art screws as shown in FIGS. 6A, 6B and 6C. The greater axially length of the flutes formed in accordance with the present invention result in a screw which is much more readily inserted into a work piece, particularly when the work piece is formed of a thicker material. Referring to FIGS. 5A and 5B, for comparison purposes, the dimensions of a typical self-drilling and self-tapping screw formed in accordance with this invention are:

$L_S$—1.25" to 3.0"
$L_F$—0.70" minimum
$L_C$—0.30"
D—0.188" to 0.205"
R—4" (approximate)
a—17° (approximate)
b—23° (approximate)

And for a prior at screw as shown in FIGS. 5a and 5B:

$L_S'$—0.3"
a—11° (approximate)
b—45° (approximate)

The greater axially length of the flutes is made possible by the manner in which they are formed in accordance with this invention.

Figure 7:
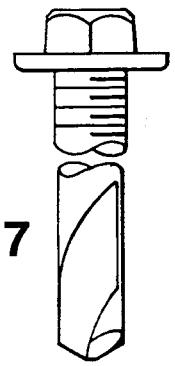
FIG. 7 is a side elevation view of a self-drilling and self-tapping screw manufactured in accordance with this invention.
Figure 8A:
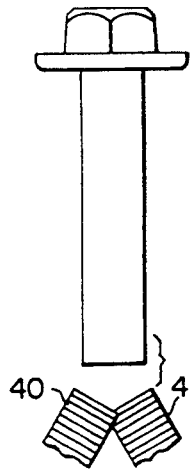
FIG. 8A is an outlined side elevation view of a screw blank showing the position of the saw blades used to form the point prior to their engagement with the blank in accordance with this invention.
Figure 8B:
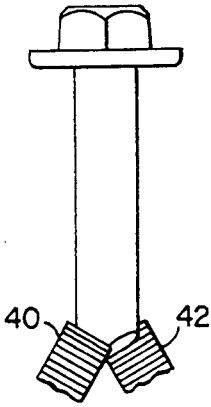
FIG. 8B is a view corresponding to FIG. 8A but with the saw blades shown in engagement with the screw blank.

The self-drilling and self-tapping screw in accordance with this invention as shown in FIG. 7 is formed from a screw blank by sawing operations as shown in FIGS. 8A and 8B and FIGS. 9A, 9B and 9C. As shown in FIGS. 8A and 8B, a point is formed on the screw blank by a pair of rotating circular saw blades 40 and 42. The saw blades 40 and 42 are positioned such that their cutting faces are at equal angles with respect to the horizontal and are offset from each other in a direction extending perpendicular from the paper with respect to the side views shown in FIGS. 8A and 8B. The screw blank as shown in FIG. 8A is brought toward the saw blades 40 and 42, such that they engage the end of the blank as shown in FIG. 8B to form a point as shown in FIG. 7 and as also shown in FIGS. 1, 2, 5A and 5B. As shown in FIG. 5B, the cutting edge of the screw in a preferred embodiment forms an angle of approximately 23° with respect to the uncut end of the blank as shown in FIG. 8A.

Figure 9A:
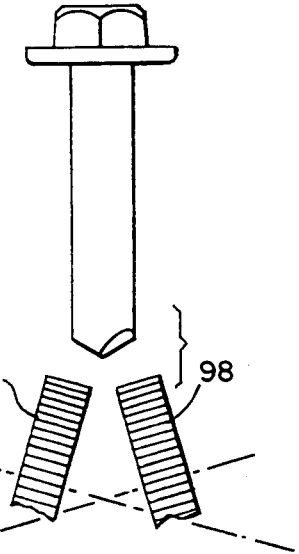
FIG. 9A is a side elevation view of the screw blank shown in FIGS. 8A and 8B with the point formed and with the saw blades used to form the flute in accordance with this invention shown prior to their engagement with the blank.
Figure 9B:
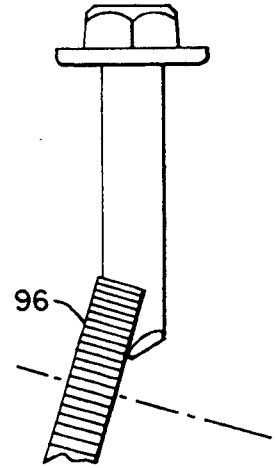
FIG. 9B is a side elevation view of the screw blank shown in FIG. 9A with one of the saw blades engaged with the screw blank to form a flute in the screw blank.
Figure 9C:
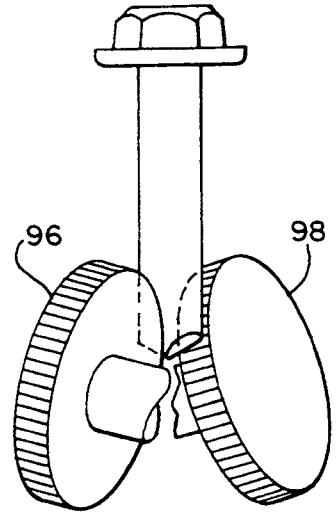
FIG. 9C is a side elevation view showing both saw blades in one of the positions in which they cut the flutes in the screw blank.
Figure 10:
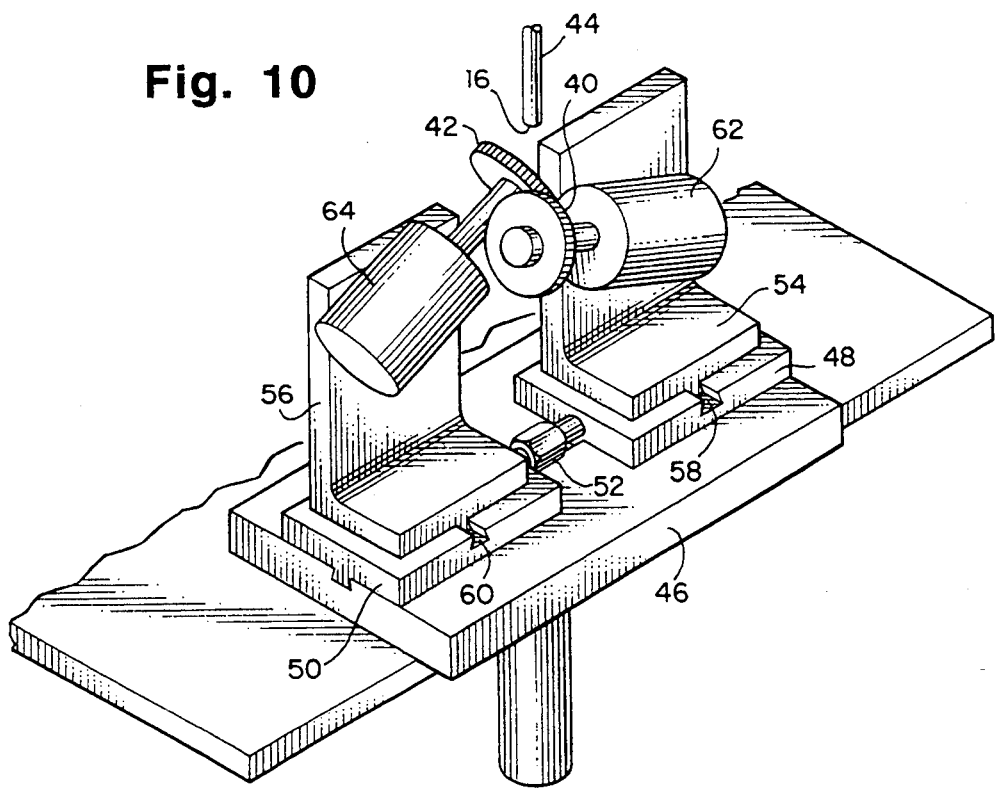
FIG. 10 is a perspective view showing a portion of a screw blank positioned above a pair of saw blades and a representation of a drive and support mechanism for the pair of saw blades used to form a point on a screw blank in accordance with this invention.

Referring to FIG. 10, a perspective view is provided of a general representation of a support and drive mechanism for the saw blades 40 and 42 shown in FIGS. 8A and 8B. The cutting surfaces of the saw blades 40 and 42 are positioned close to each other. As the distal end 16 of the screw blank 44, only a portion of which is shown, and the cutting surfaces are brought into engagement, the sloping portions of the tip, one of which 30, is shown in FIG. 1, are formed. Saw blades 40 and 42 as shown in FIG. 9 are supported on a platform 46 on adjustable blocks 48 and 50, the positions of which with respect to each other may be adjusted by adjustment means 52.

Drive means for the saw blades are supported from the blocks 50 and 52 such as by L-shaped members 54 and 56. The L-shaped members 54 and 56 are secured to the blocks 50 and 52 such as by dove tail mortises and tenons 58 and 60. The cylindrical bodies 62 and 64 which represent rotary drive means for the blades 40 and 42 respectively are adjustably supported on the L-shaped members 54 and 56 such that the angles of the saw blades with respect to each other and with respect to the platform 46 may be adjusted. The particular manner in which the saw blades 40 and 42 are driven is a matter of design choice of greater importance in accordance with this invention is the positioning of the saw blades 40 and 42 with respect to each other and to the distal end 16 of the screw blank 44.

As shown in FIG. 10, to form a cutting tip on the screw blank 44, the distal end 16 is brought into engagement with the saw blades 40 and 42, and the blades 40 and 42 and the distal end 16 of the screw blank 44 continue their movement toward each other until the desired tip is formed on the screw blank 44. The limit of movement of the blades 40 and 42 and the screw blank 44 toward each other is generally reached when the distal end 16 of the screw blank reaches the lowermost edges of the saw blades as shown in FIGS. 8A and 8B.

Figure 12:
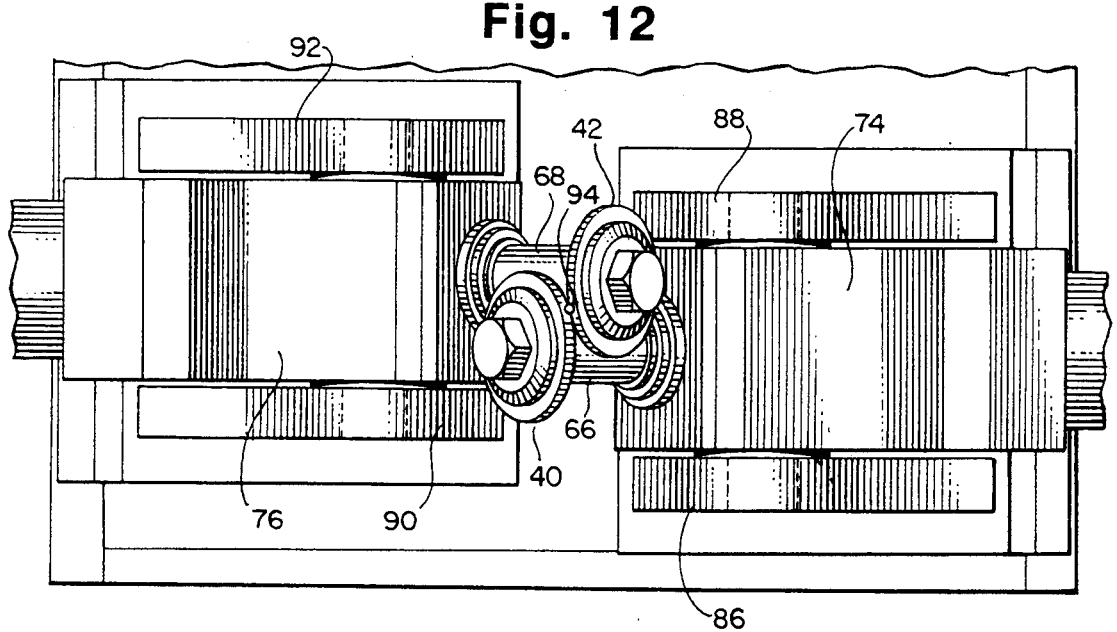
FIG. 12 is a top plan view of a preferred embodiment of the saw blades and drive and support mechanism therefor used to form a point on a screw blank in accordance with this invention.
Figure 13:
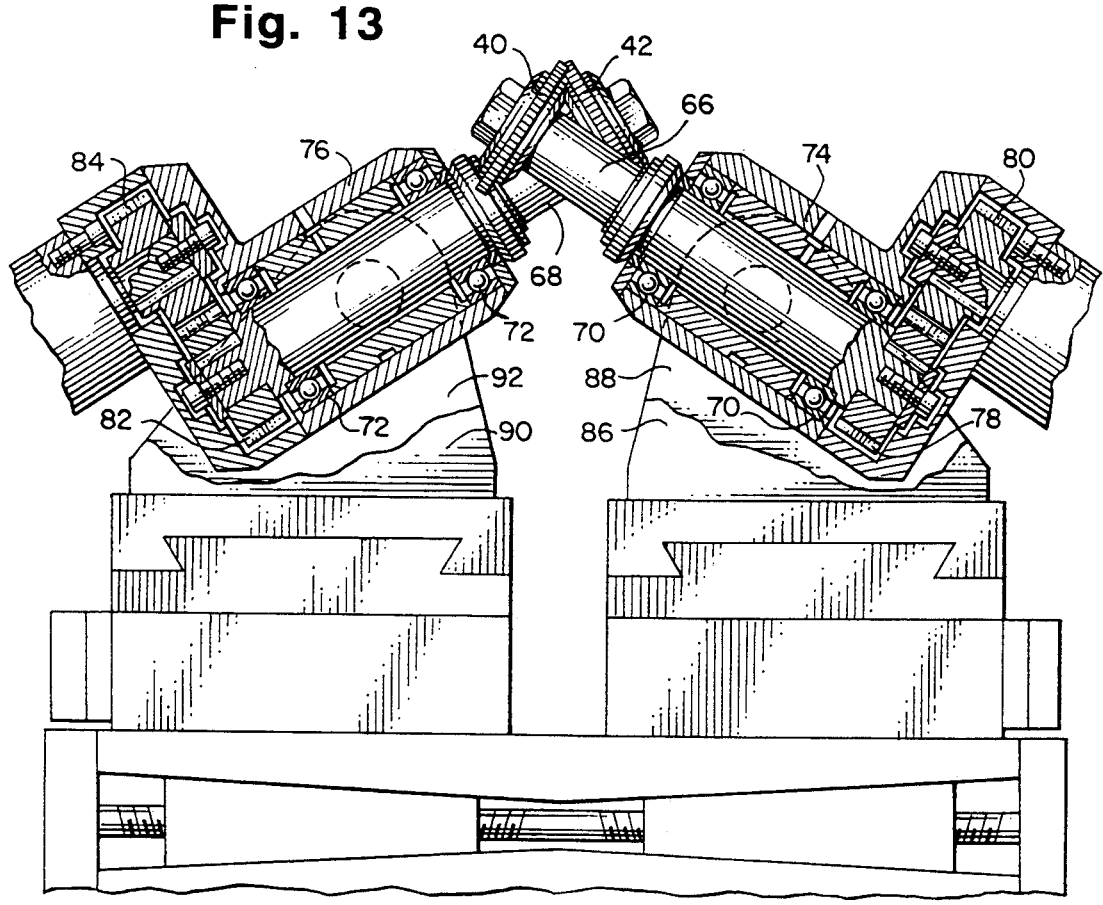
FIG. 13 is a side elevation view of the saw blades and the drive and support mechanism shown in FIG. 12.

Referring to FIGS. 12 and 13, more detailed drawings of an embodiment of the support and drive arrangement for the saw blades 40 and 42 is shown. As shown in FIGS. 12 and 13, the saw blades 40 and 42 are mounted on shafts 66 and 68 which are supported by bearings 70 and 72 respectively in housings 74 and 76 respectively. Included in housing 74 are gears 78 and 80 and in housing 76 gears 82 and 84. Gears 80 and 84 are secured on shafts which are driven by prime movers, such as electric motors (not shown). As shown in FIG. 13, the housings 74 and 76 are pivotally supported on members provided on each side of the housings. The support members for housing 74 are 86 and 88 while those for housing 76 are 90 and 92. The position at which the distal end 16 of the screw blank 44 engages the saw blades 40 and 42 is shown at 94 in FIG. 13.

Figure 11:
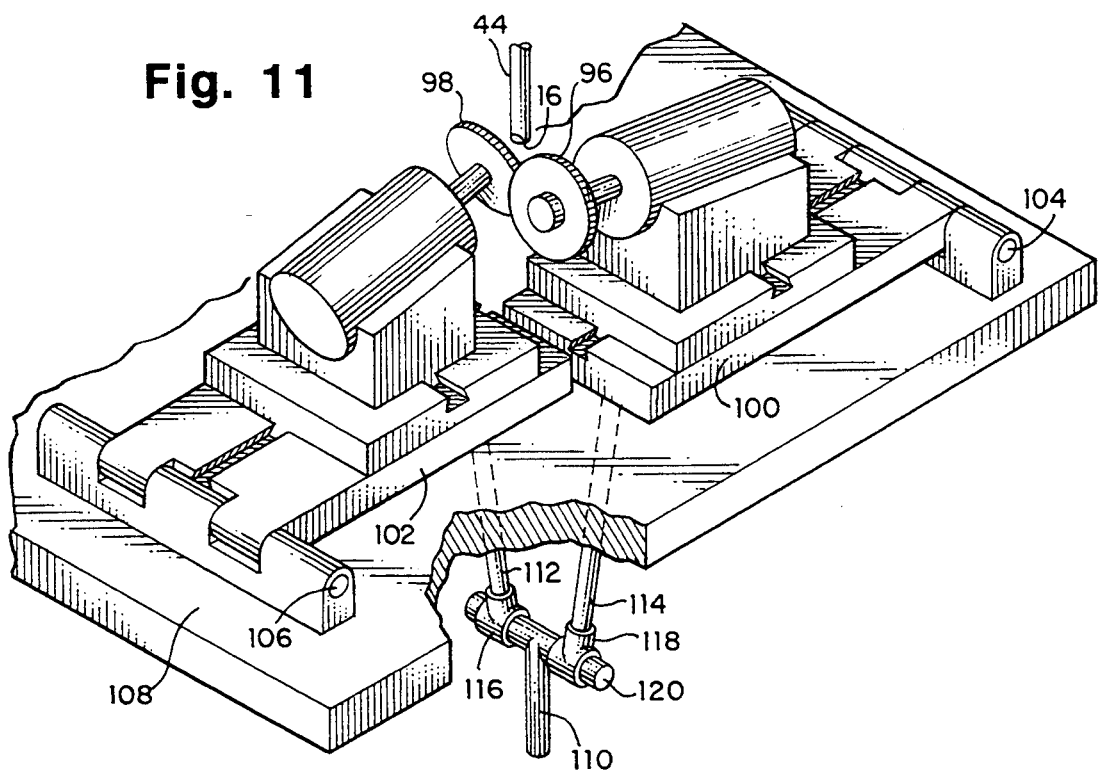
FIG. 11 is a perspective view of the saw blades and a representation of a drive and support mechanism used to form flutes on a screw blank in accordance with this invention.

Referring to FIGS. 9A, 9B and 9C and FIG. 11, the manner in which flutes are formed in accordance with this invention will be described. Each of the saw blades 96 and 98 which form the flutes are positioned such that the shafts upon which they are mounted may be pivoted about a line which is perpendicular to the central axis of the screw blank 44 and which are in planes parallel to the flat parallel sides of the blades. With the distal end 16 of the screw blank 44 positioned adjacent the cutting edges of the blades 96 and 98 as shown in FIG. 9A, the shaft supports of the blade 96 is rotated in a clockwise direction and the shaft supports of the blade 98 is rotated in a counter clockwise direction to form the flutes on the blank as shown in FIGS. 9B and 9C. A schematic representation of the support and drive mechanism for the blades 96 and 98 which form the flutes is shown in FIG. 11. The support and drive arrangements for the blades 96 and 98 used to form the flutes differs from that for forming the tip in that support platforms 100 and 102 for the drive means for the blades 96 and 98 respectively are separately supported. Platforms 100 and 102 are pivotally supported by pivot pins 104 and 106 respectively on a platform 108. With the screw blank 44 moved from the position shown in FIG. 11 to where it just comes into engagement with the blades 96 and 98, the blades are moved upward along the stem of the blank by upward movement of a drive rod 110, which in turn causes upward movement of rods 112 and 114. The rods 112 and 114 are pivotally supported at 116 and 118 on a cross member 120 to rod 110. The upward movement of the blades along the shank 18 of the screw blank 44, causes them to cut the flutes as illustrated by FIGS. 9B and 9C.

By forming the tip in a first operation and the flutes in a second operation, not only is an improved self-drilling and self-tapping screw formed in accordance with this invention, but it is also possible to more quickly form the tip and flutes than has been possible with prior manufacturing techniques.

Figure 14:
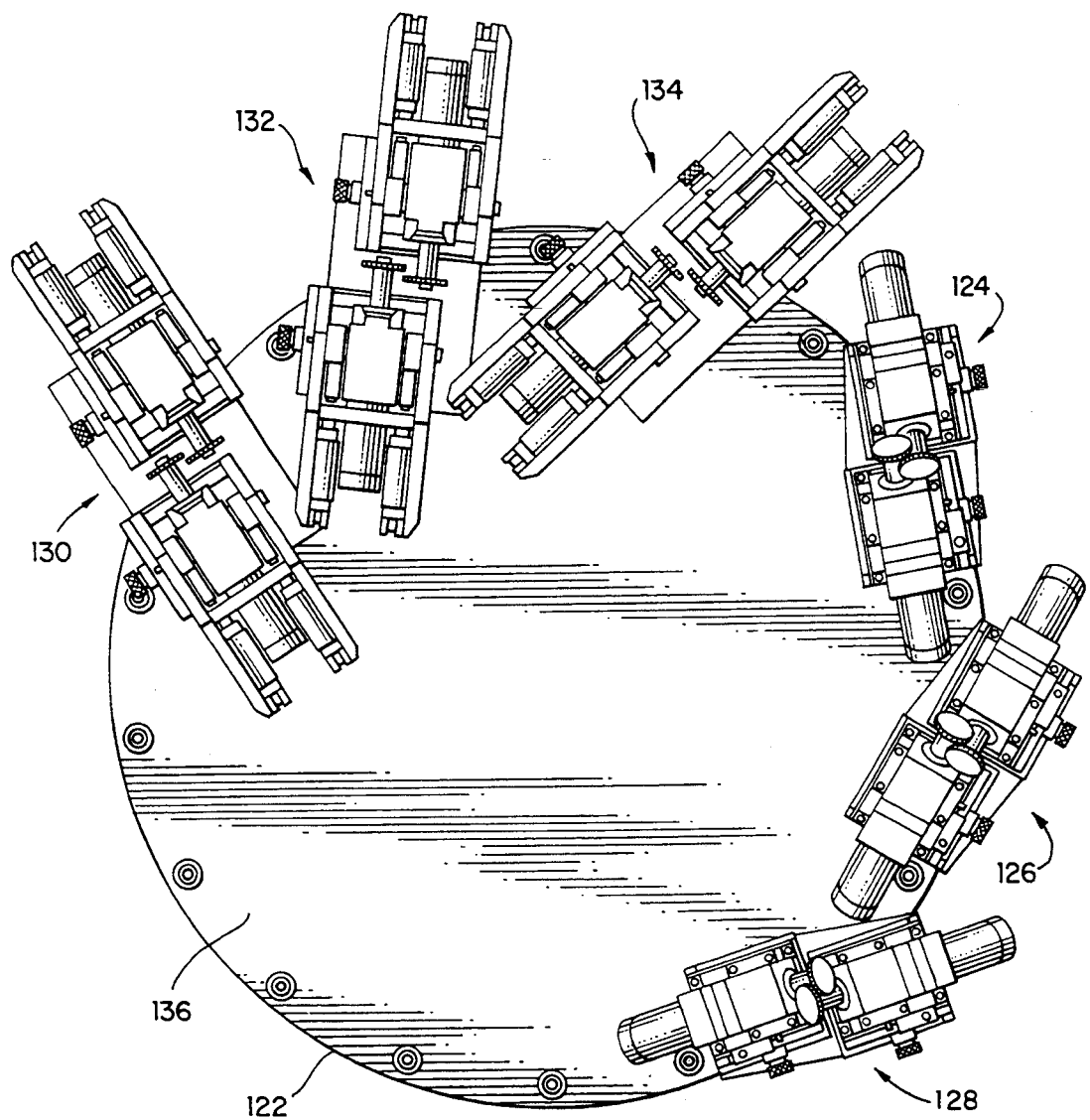
FIG. 14 is a top elevation view of a tool arrangement for forming points and flutes on screw blanks utilizing the mechanism shown in FIGS. 10, 11, 12 and 13.

In automating the manufacture of self-drilling and self-tapping screws in accordance with this invention, a number of work stations such as shown in FIG. 10 for forming the tip and FIG. 11 for forming the flutes may be mounted on a round table such as shown in FIG. 14. Supported on the work table 122 in FIG. 14 are three assemblies 124, 126 and 128 for forming tips on screw blanks and three assemblies 130, 132 and 134 for forming flutes on screw blanks. Using this arrangement, in the area of the work table identified by the numeral 136, screw blanks are loaded into holders which will support them as points and flutes are formed on them by the point cutting assemblies 124, 126 and 128 and flute cutting mechanisms 130, 132 and 134 respectively. With the blanks loaded in the holders in the area 136 on the table represented by the numeral 136, the table is rotated in the counter-clockwise direction to properly position three of the blanks 46 with respect to point cutting assemblies 124, 126 and 128. The blanks on which the points were previously formed by assemblies 124, 126 and 128 are at the same time properly positioned over assemblies 130, 132 and 134 to be provided with flutes at the same time the points are being formed on the next set of blanks at assemblies 124, 126 and 128. As the points and flutes are being formed, pointed and fluted screw blanks may be unloaded in the area represented by the numeral 136 and new screw blanks loaded for the next cycle of operation.

Thus, in accordance with this invention, a self-drilling and self-tapping screw and a method and apparatus for making the same is provided. The screw has improved performance characteristics, and the method and apparatus for making the same is simplified and more efficient when compared to prior art methods and apparatus.

It should be apparent to those skilled in the art that what has been described is considered at present to be the preferred embodiment of the self-drilling and self-tapping screw and method and apparatus for making the same. In accordance with the Patent Statutes, changes may be made in the self-drilling and self-tapping screw and method and apparatus for making the same as shown and described without actually departing from the true spirit and scope of this invention.

The appended claims are intended to cover all such changes and modifications which fall in the true spirit and scope of this invention.

I claim:

1. A method of making a self-drilling screw having a self-drilling point formed by first and second operations on a screw blank which has a head and a cylindrical stem, having a central axis, which extends from one side of said head to a distal end, said screw blank being held in a position wherein said distal end of said cylindrical stem is engaged successively by first and second pairs of circular saws, each of said circular saws having a central axis about which it rotates, said first pair of said saws engaging said distal end of said screw blank to form a self-drilling point, said second pair of saws engaging said stem in arcuate paths beginning at said distal end of said screw blank to form a pair of flutes, each of which has a base, and which extend from said distal end of said screw blank toward said head.

2. The method of making a self-drilling screw of claim 1, wherein the central axes of said first pair of saws move with respect to said stem in a direction coinciding with said major axis of said stem.

3. The method of making a self-drilling screw of claim 1, wherein each of said saws of said second pair of saws is pivotally supported on a pivotal axis, which pivotal axes are on opposite sides of said screw blank from each other such that said central axes of said saws are pivoted, with said second pair of saws engaging said blank to make arcuate cuts on opposite sides of said stem so as to form a pair of flutes.

4. The method of making a self-drilling screw of claim 3, wherein the pivotal axes about which said second pair of saws pivot are located in planes which are perpendicular to the central axis of said screw blank.

5. The method of making a self-drilling screw of claim 4, wherein the distance along the rotational axes of said saws between the pivotal axes about which each of said second pair of saws pivots and each of said saws is about four inches.

6. The method of making a self-drilling screw of claim 3, wherein said saws are offset from each other in a direction perpendicular to the central axis of said screw blank, such that each of said saws forms an arcuate cut which begins at said distal end of said stem, is of a maximum depth less than the radius of said stem, and which saws form flutes having sides separated by the width of said saws.

7. The method of making a self-drilling screw of claim 6 wherein the sides of said flutes are formed at an angle of 17° with respect to said central axis of said stem.

8. The method of making a self-drilling screw of claim 3, wherein said bases of said flutes are located in generally parallel planes, which planes are equally spaced on opposite sides from a plane passing through the central axis of said stem.

9. The method of making a self-drilling screw of claim 1, wherein said flutes extend for a length greater than 0.7 inches from said distal end of said screw blank.

10. A method for forming a self-drilling point on a screw blank having a cylindrical stem, having a central axis, which extends from a head and terminates in a distal end, holding said screw blank such that said cylindrical stem is addressable by rotating circular saws for forming said self-drilling point, engaging said distal end of said screw blank with a first pair of rotating circular saws each having a central axis of rotation and a peripheral cutting surface, said axes of rotation of which are at essentially equal angles to said central axis of the screw blank, said peripheral cutting surfaces of said circular saws, being located on opposite sides of said screw blank with edges of said cutting surfaces being closely spaced, such that upon engagement of said cutting surfaces with said distal end of said screw blank, a wedge like point is formed on said distal end of the screw blank, engaging said distal end of said screw blank with a second pair of rotating circular saws which are supported such that their axes of rotation pivot, such that upon engagement of cutting surfaces of said second pair of rotating circular saws with said distal end of said screw blank, centers of each of said second pair of rotating circular saws move along arcuate paths to form flutes on opposite sides of said screw blank.

* * * * *